April 23, 1929.  J. LEDWINKA  1,709,941

EXTENSIBLE DOOR FOR VEHICLES

Filed Feb. 2, 1927   2 Sheets-Sheet 1

INVENTOR:
Joseph Ledwinka,
BY John P. Farber
ATTORNEY.

April 23, 1929.  J. LEDWINKA  1,709,941
EXTENSIBLE DOOR FOR VEHICLES
Filed Feb. 2, 1927    2 Sheets-Sheet 2

INVENTOR:
Joseph Ledwinka,
BY
John P. Zarbox
ATTORNEY.

Patented Apr. 23, 1929.

1,709,941

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

EXTENSIBLE DOOR FOR VEHICLES.

Application filed February 2, 1927. Serial No. 165,303.

This invention relates to sliding windows in automobile doors, and more particularly to that type of window which is of substantially the width of the body of the door.

One of the principal aims of automobile body builders has been to devise an automobile door construction for enclosed bodies having a window in which the opaque projection at the sides of the door is reduced to a veritable minimum. Not only does this provide for a maximum of vision for the occupants of the car but it also practically eliminates that dangerous condition known as "blind spots". Heretofore, and prior to this invention, this desired condition of maximum vision in the door has been attained by the use of side rails extending to the top of the door, these side rails being of minimum cross section and of a depth not substantially exceeding the depth of the glass run channel which is secured to the inner face of the rail. In each instance, however, the door extended the full length between the body sill of the automobile and the roof line thereof, and even when the window glass was in its lower position there were still present the vertically extending side rails extending upwardly above the belt line of the door.

One of the primary objects of this invention has been to eliminate those portions of the side rails which extend upwardly above the belt line of the door such that the door body itself extends only from the body sills to the belt line of the automobile.

A further object of the invention is the provision of a door extending only to the belt line of the automobile including a window arranged to be raised from within the body of the door upwardly to the full height of the door opening.

A still further object of the invention is the provision of a door in which the upwardly extending side rails have been eliminated but which includes means for rigidly supporting a sliding window when the latter is raised to its closed position.

A still further object of the invention is the provision of a door extending only to the belt line of the automobile body, which door is provided with vertically movable members constituting extended supports for the sides of the window frame when the latter has been raised to its full height.

A still further object of the invention is the provision of means yieldingly keeping the supports collapsed when the window is lowered, but permitting their extension when the window is raised to its full height.

A still further object of the invention is the provision of means for limiting the upward movement of the members which support the window in its final closed position.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Figure 1:
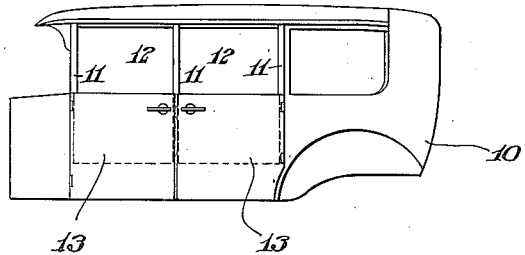
Figure 1 represents an automobile body, the doors of which embody the principles of this invention.
Figures 2, 3:
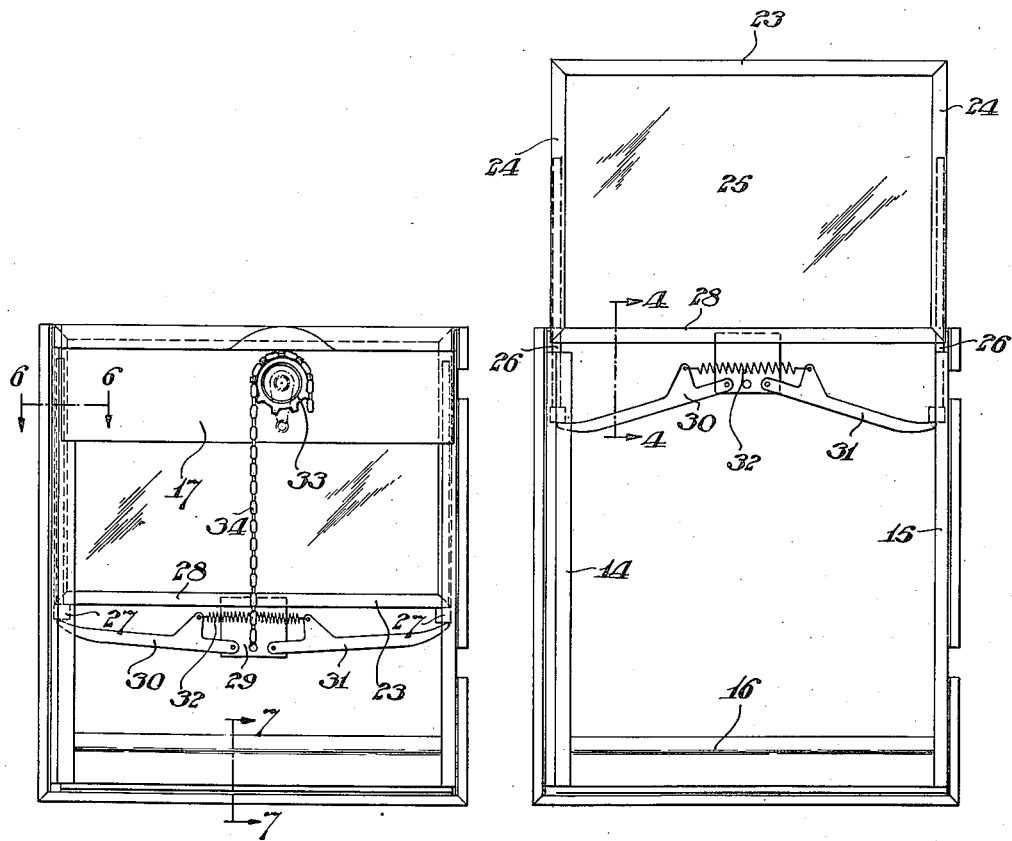
Figure 2 is a side elevation of the door, showing the window in open or lowered position.
Figure 3 is a view similar to Figure 2, showing the window in closed or raised position, the window regulator in this instance, however, being omitted.
Figure 7:
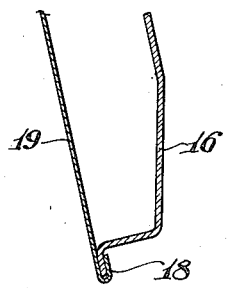
Figure 6:
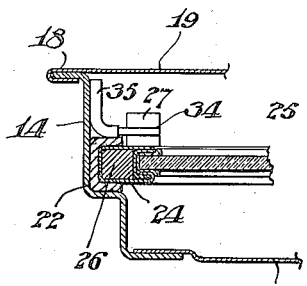

Figures 6 and 7 are horizontal and vertical sections taken on the lines 6—6 and 7—7, respectively, of Figure 2.

Referring more particularly to the drawings, it will be seen that the automobile body 10 is provided with the usual door posts 11, which extend from the body sills upwardly to the roof line of the automobile. These door posts define the door openings 12 in which are arranged the doors 13. Inasmuch as both the front and rear doors are substantially similar in all respects, only one of such doors will be described in the following description.

Figure 4:
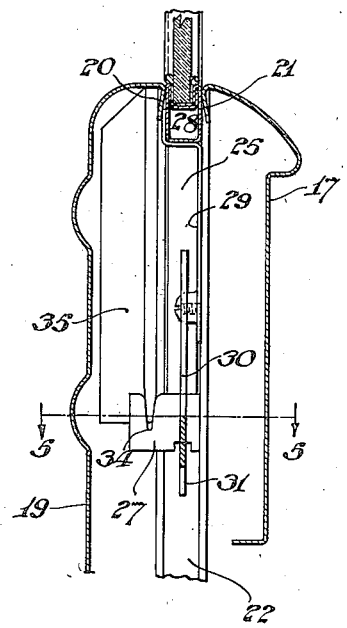
Figure 4 is a vertical section view taken on the line 4—4 of Figure 3.
Figure 5:
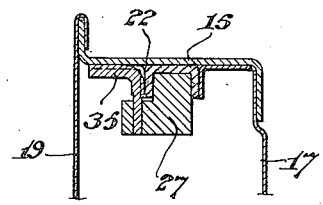
Figure 5 is a horizontal section taken on the line 5—5 of Figure 4.

The door 13 comprises the side rails 14 and 15, interconnected at their lower ends by the bottom rail 16 and at their upper ends by the cross panel 17. As most clearly appears in Figures 5, 6 and 7, the side rail 15, constituting the hinge rail of the door, is of simple Z cross section as is the bottom rail 16, while the side rail 14, constituting the jamb rail of the door, is of substantially double Z cross section. Secured to these side and bottom rails, preferably by clinching the edges thereof over the free edges of the door rails, as indicated at 18, is the outside door panel 19. This panel 19 is turned inwardly at its upper edge to provide the depending flange 20 spaced from a similar flange 21 formed along the upper edge of the transversely extending panel 17. These flanges 20 and 21, as indicated in Figure 4, are oppositely inclined for the purpose to be hereinafter more fully set forth.

It will be noted that the door so constructed extends only to the belt line of the automobile body and is provided with no upwardly extending rails for supporting the side edges of a glass window.

Secured, preferably by welding, directly to the inner faces of the side rails 14 and 15 are the inwardly presenting glass run channels 22 arranged to receive the side edges of a window frame. This window frame, designated generally by the reference numeral 23, comprises side, top and bottom members suitably secured together, the side members 24 of which are of substantially hollow cross section. A window glass 25 is suitably secured within this frame.

Telescoped within the hollow members 24 of the window frame 23, and arranged for vertical movement therein, are a pair of rigid rods 26, the lower ends of these rods being provided with enlarged heads 27. Normally, when the window is in its lowered position within the body of the door 13, the rods 26 are projected to their full extent into the hollow side members of the window frame, such that the horizontally extending bottom member 28 of the window frame is engaged by the enlarged heads 27 of the rods. Secured to this bottom member 28, preferably by welding, centrally of the opposite ends thereof, is the depending plate member 29, to the lower corners of which are pivotally secured the oppositely extending arms 30 and 31. The free ends of these arms terminate beneath the enlarged heads 27 of the rods 26, and are urged upwardly against these enlarged heads by a tension spring 32 suitably interconnecting the arms 30 and 31. Mounted upon the upper cross panel 17 is a window regulator mechanism 33 including a hand operated sprocket connected to the depending plate 29 by the sprocket chain 34.

It will thus be seen that upon operating this window regulator mechanism, the plate 29 will be lifted vertically, carrying with it the window frame 23. The spring 32, which interconnects the arms 30 and 31, is of a predetermined strength, such that it keeps the rods 26 telescoped within the window frame at all times except when the window is raised to its highest position.

When the window frame, however, approaches the limit of its upward movement, means are provided for limiting further upward movement of the rods 26 in order to provide a secure foundation within the door for the window when the latter is in its completely closed position. For this purpose, the enlarged heads 27 of the rods 26 are provided with notches or grooves 34, which engage the lower wedge shaped ends of the angle members 35 suitably secured to the inside faces of the side rails 14 and 15 of the door at the upper ends thereof. These members 35 thus constitute stops limiting the upward movement of the rods 26 in the glass run channels 22 without, however, interfering with the further upward movement of the window frame itself.

Further movement of the window frame beyond the point where the stop members 35 come into operation to limit further vertical movement of the rods 26 is effected by overcoming the force of the spring 32. Continuous actuation of the window regulator mechanism 33 lifts the plate member 29 upwardly beyond the plane of the lower ends of the rods 26, with the result that the arms 30 and 31 pivotally supported thereon assume the position shown in Figure 3 and the window frame is lifted almost entirely out of the body of the door. The rods 26, due to the fact that they have not been lifted to the full extent that the window frame has been, are supported throughout their lower lengths by the channels 22 in which they move, the upper ends of these rods extending freely above the upper edge of the door and constituting rigid supports for the side edges of the window frame when the latter is raised to its final position. As will be readily understood, when the window is only partially opened; that is, when it is only partially raised, the window frame side members 24, riding as they do in the glass run channels 22, serve themselves to maintain the window against lateral displacement, the rods 26 in such case being projected their full length into the hollows of said side members by the spring 32.

Any suitable brake or clutch mechanism (not shown) may be employed in association with the regulator mechanism for insuring positive maintenance of the window in any desired position, the weight of the window being of itself sufficient to cause it to drop down into the body of the door when the brake mechanism is released. It will be seen that the construction, such as has just been described, provides for an absolute maximum of vision, the usual side rails of the doors being altogether dispensed with when the window is open, leaving only the door posts themselves in the way of absolutely free vision. On the other hand, when the window is raised to its closed position, the only additional opaque elements which might obstruct one's freedom of vision are the side members of the window frame, and these side members are of such minimum cross section that they reduce to a veritable minimum the opaque projection of the door frame. The window is easily operated, the operating mechanism therefore being exceedingly simple and easy to install, at the same time that it is rigidly supported against lateral displacement no matter in what position the window may be.

It will be understood that while this invention has been described as being particularly useful in connection with doors on automobile bodies, it may also be used in other connections as may be desired. Further, while the foregoing illustrates the preferred construction for carrying out the principles of the invention, various changes and modifications may be made without, however, departing from the real spirit of the invention. Accordingly, it is desired to claim the invention broadly, as well as specifically, as indicated by the appended claims.

What is claimed as new and useful is:

1. In combination, an automobile door of an extent sufficient to cover the lower portion of the door opening, said door being provided with a chamber therein, a window frame normally housed within said chamber, extensible means for supporting the window frame when in raised position, and means yieldingly associated with said window frame and said extensible means for maintaining said extensible means collapsed at all times except when the window is in its raised position.

2. In combination, an automobile door, the side rails of which are of single thickness sheet metal, vertically extending channels secured to the inner faces of said side rails, a window frame extending from side to side of said door, the side members of said window frame being of hollow cross section and arranged to slide within said channels, vertically extending members telescoped within said hollow members, means bearing upon the lower ends of said vertically extending members and exerting a lifting force thereon to keep them in their raised position, and means operable to limit the upward movement of said vertically extending members.

3. In combination, an automobile door, a sliding window therefor of a width substantially equal to the width of the body of the door, vertically extending members associated with the side edges of said window, means exerting an upward thrust against the lower ends of said vertically extending members to keep them in raised position, and means for continuing the upward movement of said window against the action of said thrust exerting means and independently of said vertically extending members.

4. In combination, an automobile door, a sliding window associated therewith and arranged to be normally housed within the body thereof, a pair of vertically extending members associated with the side edges of said window, a pair of oppositely extending arms pivotally carried by said window, the free ends of said arms engaging the lower ends of said vertically extending members, means for insuring constant engagement between the free ends of said arms and the lower ends of said vertically extending members, and window lifting means operatively associated with said door and said window for raising the latter.

5. In combination, an automobile door, a window slidably associated therewith, said window being provided with side members of substantially hollow cross section, vertically extending members telescoped within said side members, means exerting a lifting force centrally of the bottom edge of said window, means operatively associated with said bottom edge and arranged to exert vertical thrusts upon the lower ends of said vertically extending members such that during the greater portion of the upward travel of said window, said members are kept telescoped within said side members, and means limiting the upward movement of said vertically-extending members without preventing the further upward movement of the window upon said vertically-extending members.

6. In combination, an automobile door, the upper edge of which terminates substantially at the belt line of the automobile body, a sliding window for said door normally housed within the body thereof, a plate fixed to and depending from the bottom edge of said window, a pair of oppositely-extending arms pivotally supported upon said plate, means for constantly urging the free ends of said arms upwardly, a pair of rods associated with the side edges of said window, the lower ends of which are in engagement with the free ends of said oppositely-extending arms, means exerting an upward pull upon said plate member and the arms pivotally supported thereon, and means for effecting relative vertical movement between said plate member and the free ends of said arms.

7. In combination, an automobile door, a sliding window frame operatively associated therewith and of a width substantially equal to the width of the body of the door, a pair of members associated with the side edges of said window frame constituting vertically-extending supports for the window when the latter is in its fully raised position, a pair of oppositely-extending arms pivotally supported from the lower edge of said window frame, said arms extending substantially across the full width of the window frame, and resilient means interconnecting said arms whereby to constantly urge the free ends thereof upwardly into engagement with the lower ends of said vertically-extending support members.

In testimony whereof he hereunto affixes his signature.

JOSEPH LEDWINKA.